April 15, 1924.

C. W. TURNER

PNEUMATIC TIRE

Filed July 11, 1923   2 Sheets-Sheet 1

Inventor

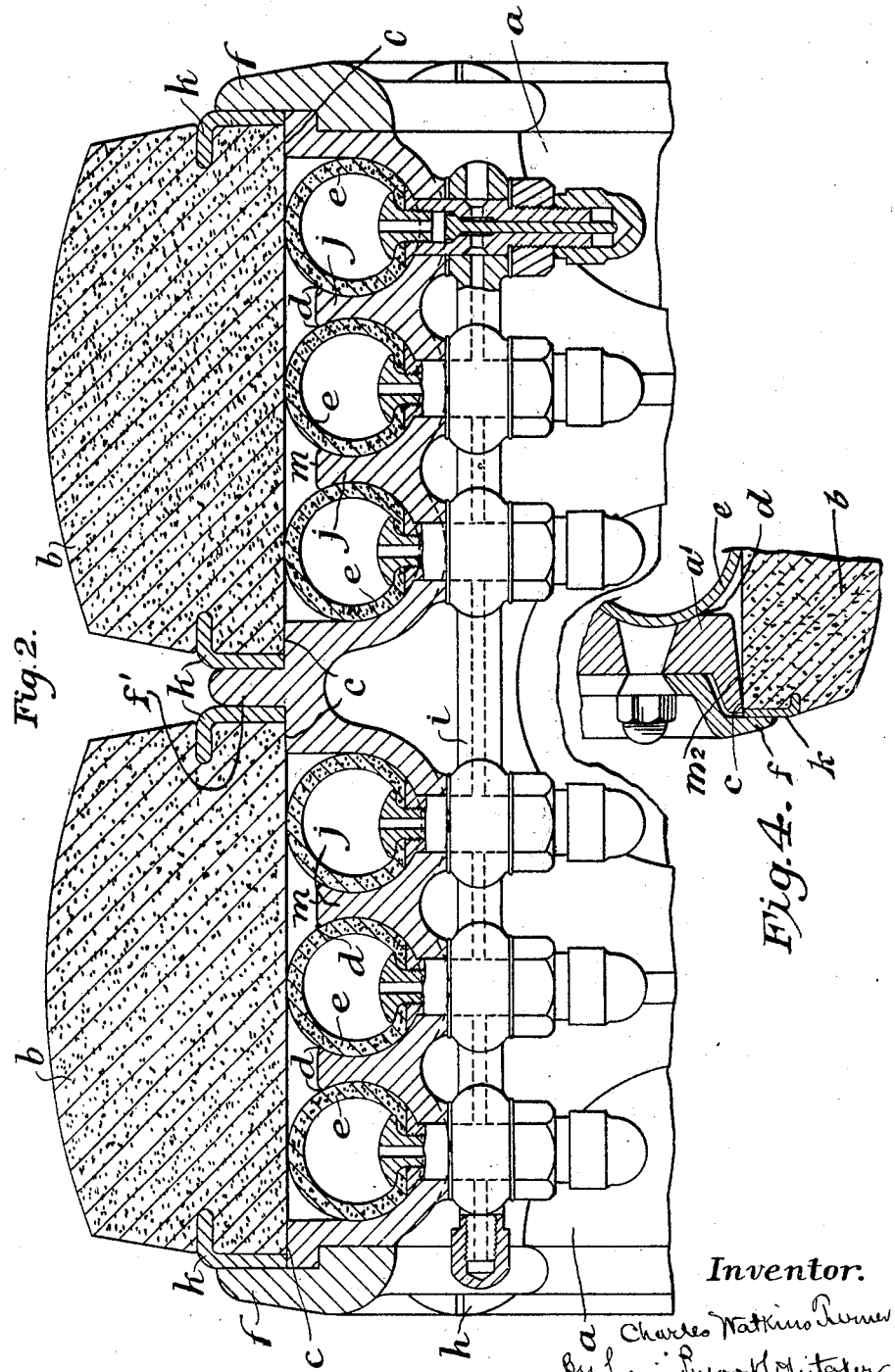

Patented Apr. 15, 1924.

1,490,648

UNITED STATES PATENT OFFICE.

CHARLES WATKINS TURNER, OF LONDON, ENGLAND.

PNEUMATIC TIRE.

Application filed July 11, 1923. Serial No. 650,968.

*To all whom it may concern:*

Be it known that I, CHARLES WATKINS TURNER, a subject of the King of Great Britain, residing at 44 Rosendale Road, Dulwich, London, England, have invented new and useful Improvements in Pneumatic Tires, of which the following is a specification.

This invention relates to improvements in pneumatic tires more particularly for use with heavy vehicles, such as omnibuses.

According to my invention I make use of one or more pneumatic tubes applied in an annular groove or grooves formed in the periphery of the wheel rim, which is provided at each side of the grooved portion with tread supporting shoulders, and is also provided either adjacent to said shoulders, where a single pneumatic tube is employed, or between said grooves, where a plurality of tubes is employed, with auxiliary annular tread supporting surfaces. A solid tire or tread having a cylindrical inner surface is forced onto the rim over the pneumatic tube or tubes so that the tubes engage the inner surface of the tread and support it between said shoulders. The rim is provided with clamping flanges to engage the tread and prevent it from lateral displacement, and the tread is also provided at each side with annular stiffening rings, L-shaped in cross section, each having a vertical flange interposed between the tread and one of the clamping flanges, and a horizontal flange engaging an annular recess in the side of the tread.

To enable the invention to be fully understood I will describe it by reference to the accompanying drawing, in which:—

Figure 2 is a view similar to Figure 1 showing a road vehicle wheel rim fitted with a pair of such tires and Figure 3 is also a similar view to Figure 1, showing a wheel rim with a single tube tire.

Figure 4 is a partial sectional view of the construction illustrated in Figure 3 showing a slight modification.

$a$ is the rim of the vehicle wheel and $b$ indicates the solid tire or tread therefor supported at the edges on the said rim as indicated at $c, c$.

Figure 1:
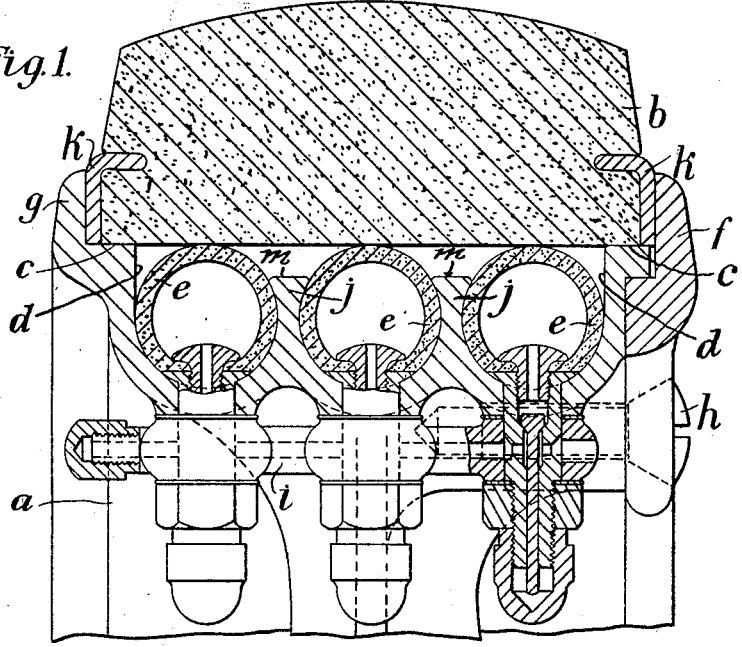
Figure 1 is a transverse section of the rim of a road vehicle wheel provided with a pneumatic tire made in accordance with the invention and having three pneumatic tubes.
Figure 3:
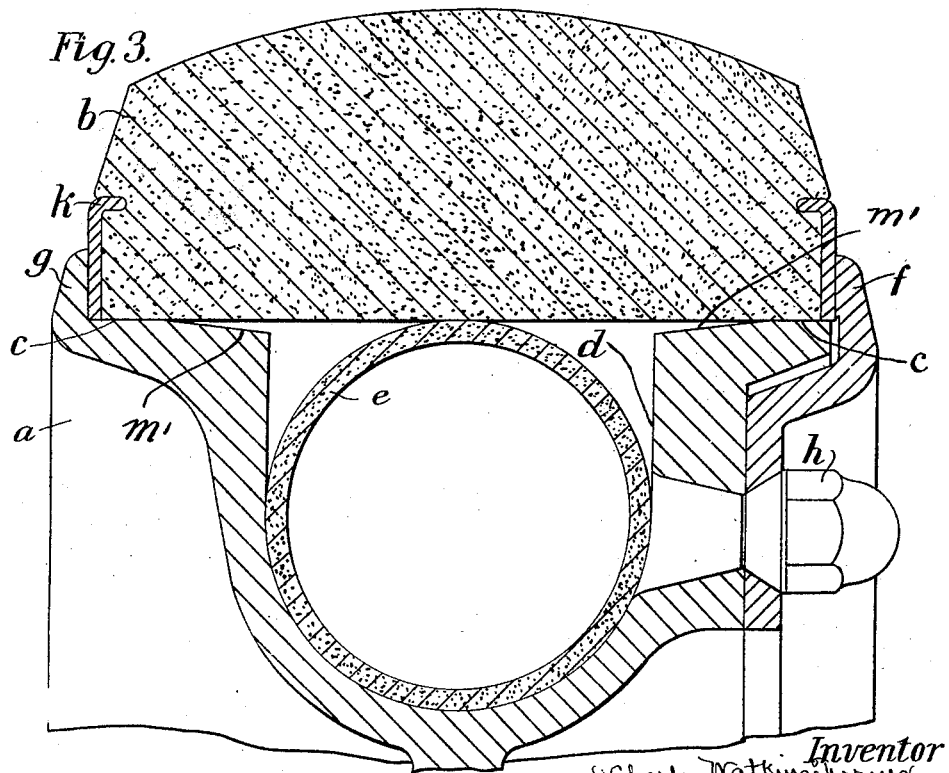

In Figures 1 and 3 a single tread is shown, whereas in Figure 2, two treads are employed. $d$ indicates the semicircular grooves in the rim for the pneumatic tubes $e$, a series of three of such grooves being shown in Figure 1, two series of three each in Figure 2 and a single groove in Figure 3. $f$ indicates the detachable clamping flanges of the rims which are removable to enable the tires to be placed in position over the pneumatic tubes $e$ by forcing the said tires sidewise into the rim against fixed clamping flanges $g$, the flanges $f$ then being secured in position by screws $h$, or other suitable means. The pneumatic tubes $e$ are then inflated so as to assist in supporting the tires.

In Figures 1 and 2 the members of each of the two series of pneumatic tubes $e$ therein shown are connected together by a common inflation tube $i$.

The wheel rim is provided with supporting shoulders $c$ at each side of the grooved portion, upon which shoulders the edge portions of the solid tread $b$ rest. The inner face of the tread is made cylindrical, and is supported between the shoulder, $c, c$, by the inflatable pneumatic tube or tubes $e$. I also provide annular auxiliary tread supporting surfaces between said shoulders and of less diameter than said shoulders for supporting the tread in case of the deflation or undue compression of the tube or tubes. Where a plurality of tubes are employed these auxiliary tread supporting surfaces $m$ will be provided by the exterior faces of partitions $j$ located between the grooves in which the pneumatic tubes are located. Where a single pneumatic tube is employed, I prefer to provide the rim with auxiliary supporting surfaces $m'$ extending from the shoulders $c$ inwardly to the groove in which the tube is located, as indicated in Fig. 3. In some instances the walls of the rim may be carried over the pneumatic tube $e$, as indicated at $a'$ in Fig. 4 thus extending the auxiliary supporting surfaces indicated at $m^2$ further toward the center of the rim to afford additional support for the tread in case the tube is deflated or becomes unduly compressed.

In Figure 2 I have shown a construction in which two treads are employed, arranged side by side and held from lateral displacement by clamping rings *f* and a central flange *f'*, each tread being constructed as before described and supported by the shoulders *c* of the rim, and by a plurality of tubes *e*, between which are located the partitions *j* having the auxiliary and annular tread supporting surfaces *m*. K are metal stiffening rings of L-section having their vertical flanges interposed between the clamping flanges and the tread, and horizontal flanges engaging recesses in side faces or edges of the tread as shown.

What I claim and desire to secure by Letters Patent is:—

1. The combination with a wheel rim provided with an annular groove in its outer face and annular tread supporting shoulders laterally displaced with respect to opposite sides of said groove, an inflatable annular tube lying in said groove, and having its outer surface substantially in alignment transversely with said shoulders, a solid cushion tread provided with a cylindrical inner surface resting upon said shoulders, and supported upon said tube between said shoulders when the tube is inflated, and clamping flanges on said rim for engaging said tread, said rim being provided on opposite sides of said tube and between said shoulders with annular auxiliary supporting portions, of less diameter than said shoulders for supporting the tread when the tube is deflated or unduly compressed.

2. The combination with a wheel rim provided with an annular groove in its outer face, and annular tread supporting shoulders laterally displaced with respect to opposite sides of said groove, an inflatable annular tube lying in said groove, and having its outer surface substantially in alignment transversely with said shoulders, a solid cushion tread provided with a cylindrical inner surface resting upon said shoulders and supported upon said tube between said shoulders when the tube is inflated, and clamping flanges on said rim for engaging said tread, said rim being provided on opposite sides of said tube and between said shoulders with annular auxiliary supporting portions, of less diameter than said shoulders for supporting the tread when the tube is deflated or unduly compressed, said cushion tread being provided at each side with annular grooves, and stiffening rings, L-shape in cross section interposed between each side of said tread and the adjacent clamping flange and contacting with said shoulders at their inner edges and having annular flanges engaging said recesses in the tread.

3. The combination with a wheel rim provided with a plurality of annular grooves in its outer face and annular tread supporting shoulders laterally displaced with respect to opposite sides of said grooves, inflatable annular tubes in said grooves, having their outer surfaces substantially in alignment transversely with said shoulders, a solid cushion tread having a cylindrical inner surface resting upon said shoulders and supported between said shoulders upon said tubes when the latter are inflated, and clamping flanges on said rim for engaging the tread, said rim being provided with partitions between said grooves having auxiliary annular supporting faces of less diameter than said shoulders for supporting the tread when the tube is deflated or unduly compressed.

4. The combination with a wheel rim provided with an annular flange located centrally of its width, and exterior clamping flanges adjacent to its edges, said rim being provided between the central flange and each exterior flange with annular tread receiving shoulders adjacent to said flanges, and separate annular cushion treads each having an inner cylindrical face engaging shoulders of the rim between said central flange and one of said exterior flanges, and supported between said shoulders by the outer surfaces of said tubes when the latter are inflated, and partitions having exterior annular auxiliary supporting faces of less diameter than said shoulders for supporting said treads when a tube or tubes are deflated or unduly compressed.

CHARLES WATKINS TURNER.